US008787718B2

(12) United States Patent
Tanabe et al.

(10) Patent No.: US 8,787,718 B2
(45) Date of Patent: Jul. 22, 2014

(54) OPTICAL FIBER RIBBON, METHOD OF MANUFACTURING OPTICAL FIBER RIBBON, AND OPTICAL CABLE

(75) Inventors: Kengo Tanabe, Tokyo (JP); Takao Kaneko, Tokyo (JP)

(73) Assignee: SWCC Showa Cable Systems Co., Ltd., Tokyo (JP)

( * ) Notice: Subject to any disclaimer, the term of this patent is extended or adjusted under 35 U.S.C. 154(b) by 0 days.

(21) Appl. No.: 13/577,775

(22) PCT Filed: Sep. 21, 2011

(86) PCT No.: PCT/JP2011/005313
§ 371 (c)(1),
(2), (4) Date: Aug. 8, 2012

(87) PCT Pub. No.: WO2012/131811
PCT Pub. Date: Oct. 4, 2012

(65) Prior Publication Data
US 2014/0016905 A1  Jan. 16, 2014

(30) Foreign Application Priority Data

Mar. 30, 2011  (JP) ................................ P2011-076070

(51) Int. Cl.
*G02B 6/44*  (2006.01)
(52) U.S. Cl.
USPC .......................................... 385/114; 385/102
(58) Field of Classification Search
USPC .................................................. 385/102, 114
See application file for complete search history.

(56) References Cited

U.S. PATENT DOCUMENTS

2011/0110635 A1* 5/2011 Toge et al. .................... 385/102

FOREIGN PATENT DOCUMENTS

| JP | 3-235905 | 10/1991 |
| JP | 2003-241041 | 8/2003 |
| JP | 2007-279226 | 10/2007 |
| JP | 2010-2743 | 1/2010 |
| WO | WO 2010/001663 A1 | 1/2010 |

OTHER PUBLICATIONS

JIS K 6833-1, Japanese Industrial Standard "Adhesives—General testing methods—Part 1: General properties", Japanese Standards Association (2008) (28 pages).
JIS K 6833-2, Japanese Industrial Standard "Adhesives—General testing methods—Part 2: Sampling", Japanese Standards Association (2008) (18 pages).
International Preliminary Report on Patentability and Written Opinion issued by The International Bureau of WIPO on Oct. 10, 2013.

* cited by examiner

*Primary Examiner* — Eric Wong
(74) *Attorney, Agent, or Firm* — Finnegan, Henderson, Farabow, Garrett & Dunner, L.L.P.

(57) ABSTRACT

There is provided an optical fiber ribbon capable of realizing, in an optical cable, sure reliability, a reduction in size and weight, higher density, and a further improvement in workability, a method of manufacturing the same, and an optical cable using such an optical fiber ribbon. An optical fiber ribbon 10 includes four single-core coated optical fibers 11 arranged in parallel on a same plane; and coupling parts 12 arranged at intervals in a length direction and a width direction, each coupling only adjacent two of the single-core coated optical fibers 11, wherein an interval P of the coupling parts 12 coupling the same two single-core coated optical fibers is not less than 20 mm nor more than 90 mm and a length Q of each of the coupling parts 12 is not less than 1 mm nor more than 10 mm.

5 Claims, 6 Drawing Sheets

OPTICAL FIBER RIBBON, METHOD OF MANUFACTURING OPTICAL FIBER RIBBON, AND OPTICAL CABLE

CROSS REFERENCE TO RELATED APPLICATIONS

This application is a national phase application based on PCT/JP2011/005313, filed Sep. 21, 2011, which claims the priority of Japanese Patent Application No. P2011-076070, filed Mar. 30, 2011, the content of all of which is incorporated herein by reference.

TECHNICAL FIELD

The present invention relates to an optical fiber ribbon, a method of manufacturing an optical fiber ribbon, and an optical cable.

BACKGROUND ART

In accordance with the recent expansion of optical communication networks, not only sufficient reliability but also a further reduction in size and weight, higher density, and an improvement in workability have been required of optical cables.

As an optical cable realizing a reduction in size and weight, higher density, and improved workability, one with so-called rollable optical fiber ribbons, for instance, has been known, in which only two adjacent fibers out of three single-core coated optical fibers or more arranged in parallel are bonded by each resin part, the resin parts are longer in length than non-resin parts, and the resin parts adjacent in a width direction are spaced apart from each (see, for example, References 1 and 2).

Being small in bending anisotropy, such an rollable optical fiber ribbon can be cylindrically rolled or folded when housed in a cable, which enables a reduction in size and weight and higher density of the cable. In addition, the optical fibers each may be easily branched from the optical fiber ribbon and when connected, the optical fibers can be disposed in a predetermined arrangement, which enables the fibers to be collectively connected at one time.

However, in an optical cable in which these conventional rollable optical fiber ribbons are densely packed, a large strain is applied to the single-core coated optical fibers when the optical cable is bent. Accordingly, it is not possible to ensure sufficient long-term reliability. Further, this optical cable is not always satisfactory in terms of connection workability of the optical fiber ribbons. Regarding such problems, the patent reference 1 discloses one in which, in order to reduce a strain when the optical cable is bent, the resin parts each have such a thickness and a length as to easily buckle when an external force is applied in the width direction of the optical fiber ribbons. However, its effect is limited and is not fully satisfactory.

RELEVANT REFERENCES

Patent References

Reference 1: WO 2010/001663 A1
Reference 2: JP-A 2007-279226 (KOKAI)

SUMMARY OF THE INVENTION

Problems to be Solved by the Invention

It is an object of the present invention to provide an optical fiber ribbon capable of achieving, in an optical cable, higher reliability, a further reduction in size and weight, higher density, and a further improvement in workability, a method of manufacturing such an optical fiber ribbon, and an optical cable with such an optical fiber ribbon.

Means for Solving the Problems

According to an embodiment of the present invention, there is provided an optical fiber ribbon including: four single-core coated optical fibers arranged in parallel on a same plane; and coupling parts arranged at intervals in a length direction and a width direction each of the parts coupling only adjacent two of the single-core coated optical fibers, wherein an interval P of the coupling parts coupling the same two single-core coated optical fibers is not less than 20 mm nor more than 90 mm, and a length Q of each of the coupling parts is not less than 1 mm nor more than 10 mm.

According to another embodiment of the present invention, there is provided a method of manufacturing an optical fiber ribbon which includes: four single-core coated optical fibers arranged in parallel on a same plane; and coupling parts arranged at intervals in a length direction and a width direction, each of the parts coupling only adjacent two of the single-core coated optical fibers, the method including: arranging the four single-core coated optical fibers in parallel; jetting and applying ultraviolet curable resin by a jetting device having a plunger mechanism, from one side between the two adjacent single-core coated optical fibers; letting the single-core coated optical fibers pass through an assembly die; and curing the ultraviolet curable resin by ultraviolet irradiation.

According to still another embodiment of the present invention, there is provided an optical cable including the above-described optical fiber ribbon.

Effect of the Invention

In an optical fiber ribbon of an embodiment of the present invention, a strain applied to the single-core coated optical fibers can be greatly reduced when the optical cable is bent, which enables the optical cable to have sufficient long-term reliability. Further, the collective connection is easy, which makes it possible to improve connection workability of the optical cable.

In a method of manufacturing an optical fiber ribbon of another embodiment of the present invention, it is possible to efficiently manufacture such an optical fiber ribbon having excellent characteristics.

An optical cable of a further embodiment of the present invention includes such an optical fiber ribbon as described above, and accordingly can have sufficient long-term reliability and can have good connection workability.

EMBODIMENTS FOR CARRYING OUT THE INVENTION

Hereinafter, an embodiment of the present invention will be described. Note that, though the description is based on the drawings, these drawings are presented only for an illustrative purpose and in no way limit the present invention.

Figure 1:
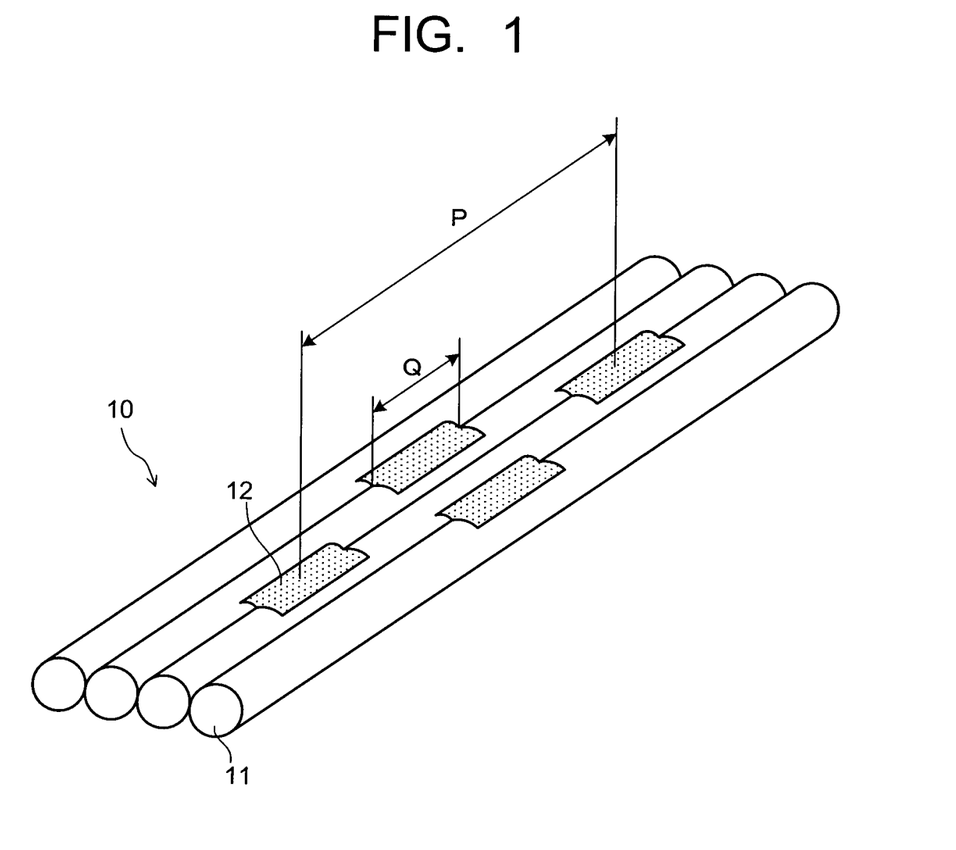
FIG. 1 is a schematic perspective view showing an optical fiber ribbon of one embodiment.

FIG. 1 is a perspective view schematically showing an optical fiber ribbon according to an embodiment of the present invention.

As shown in FIG. 1, in the optical fiber ribbon 10 of the embodiment, four single-core coated optical fibers 11 are arranged in parallel on the same plane. Coupling parts 12 each coupling only adjacent two of the single-core coated optical fibers 11 are arranged at intervals in a length direction and a width direction.

As the single-core coated optical fiber 11, used is, for example, one in which an optical fiber is coated with one layer of a protection coating or more made of ultraviolet curable resin or the like or one in which a colored layer is further provided on such a protection coating.

As a material of the coupling parts 12, ultraviolet curable resin, thermosetting resin, thermoplastic resin, or the like may be used, which can bond the single-core coated optical fibers 11. In view of easiness of formation and improvement in a strain characteristic when the optical cable is bent, the ultraviolet curable resin is preferable, and especially preferable is ultraviolet curable resin whose viscosity at 25° C. measured by a cone-plate viscometer based on JIS K 6833 is not less than 11000 mPa·S nor more than 17000 mPa·S.

A length Q of each of the coupling parts 12 is not less than 1 mm nor more than 10 mm, and preferably not less than 2 mm nor more than 4 mm. An interval P between the coupling parts 12 coupling the same adjacent two single-core coated optical fibers (hereinafter, sometimes referred to as the interval P of the coupling parts 12 or the arrangement interval P of the coupling parts 12) is not less than 20 mm nor more than 90 mm and preferably not less than 30 mm nor more than 60 mm. When the length Q is less than 1 mm, a bonding strength of the single-core coated optical fibers may greatly lower, resulting in the separation of the optical fiber ribbon when it is handled. When the length Q is more than 10 mm, an excessive strain may be applied to the single-core coated optical fibers when the optical cable is bent, which may be very much liable to deteriorate long-term reliability. When the interval P is less than 20 mm, an excessive strain may be applied to the single-core coated optical fibers when the optical cable is bent, which may be very much liable to deteriorate long-term reliability. When the interval P is more than 90 mm, connection workability of the optical fiber ribbons may be liable to be given an adverse effect. Especially preferably, the length Q of each of the coupling parts 12 is 3 mm and the interval P of the coupling parts 12 in the length direction of the single-core coated optical fibers is 65 mm.

In the embodiment, the coupling parts 12 adjacent in the width direction of the optical fiber ribbon 10 are arranged apart in a longitudinal direction from other such coupling parts 12. That is, the coupling parts 12 are arranged so that there are portions having no coupling parts 12 arranged in the width direction of the optical fiber ribbon 10. Such arrangement facilitates folding the optical fiber ribbon 10, which makes it possible to house a larger number of optical fiber ribbons 10 in a cable.

Providing that the length Q and the interval P satisfy the above requirements and the coupling parts 12 adjacent in the width direction of the optical fiber ribbon 10 are arranged apart in the longitudinal direction from other such coupling parts 12, an arrangement pattern of the coupling parts 12 is not particularly limited.

Figure 2A:
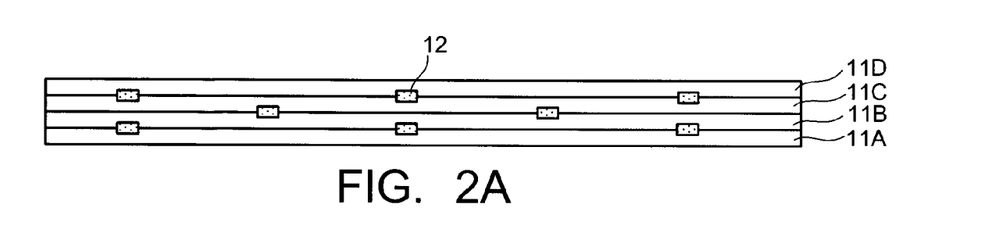
FIG. 2 is a top view showing examples of an arrangement pattern of coupling parts in the optical fiber ribbon of the embodiment.

FIG. 2 shows examples of the arrangement pattern of the coupling parts 12. In the example in FIG. 2A, coupling parts 12 coupling a first single-core coated optical fiber 11A (first core) and a second single-core coated optical fiber 11B (second core) and coupling parts 12 coupling a third single-core coated optical fiber 11C (third core) and a fourth single-core coated optical fiber 11D (fourth core) are arranged substantially at the same length-direction positions of the optical fiber ribbon, with an interval between the former ones and an interval between the latter ones being substantially equal. Further coupling parts 12 coupling the second single-core coated optical fiber 11B and the third single-core coated optical fiber 11C are each disposed so as to be substantially at a length-direction middle between the above-described coupling parts 12.

Figure 2B:
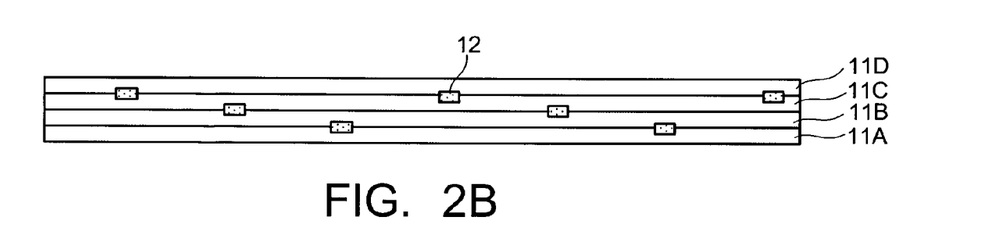

In the example in FIG. 2B, an arrangement interval in the length direction of the optical fiber ribbon between coupling parts 12 coupling a first single-core coated optical fiber 11A and a second single-core coated optical fiber 11B, that between coupling parts 12 coupling the second single-core coated optical fiber 11B and a third single-core coated optical fiber 11C, and that between coupling parts 12 coupling the third single-core coated optical fiber 11C and a fourth single-core coated optical fiber 11D are substantially equal.

Figure 2C:
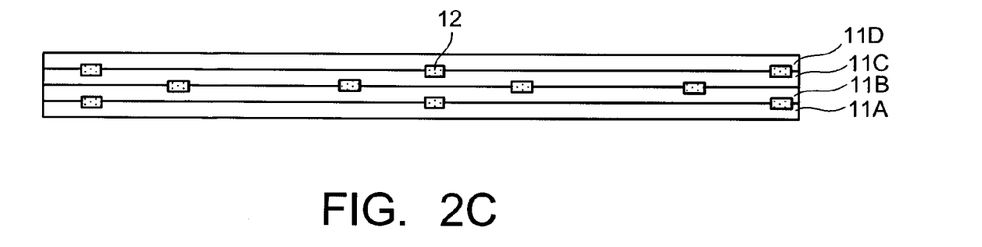

Further, as shown in FIG. 2C, for instance, a length Q and an arrangement interval P of coupling parts 12 coupling a first single-core coated optical fiber 11A and a second single-core coated optical fiber 11B, a length Q and an arrangement interval P of coupling parts 12 coupling the second single-core coated optical fiber 11B and a third single-core coated optical fiber 11C, and a length Q and an arrangement interval P of coupling parts 12 coupling the third single-core coated optical fiber 11C and a fourth single-core coated optical fiber 11D may be equal or may be different. In the example in FIG. 2C, though the coupling parts 12 are equal in the length Q, the arrangement interval P of the coupling parts 12 coupling the second single-core coated optical fiber 11b and the third single-core coated optical fiber 11c are different from the others.

Further, the coupling parts coupling the same two single-core coated optical fibers may be equal or different in the length Q and in the arrangement interval P, illustration of which is omitted.

In the optical fiber ribbon 10 of the embodiment, the interval P of the coupling parts 12 coupling the same two single-core coated optical fibers 11 is not less than 20 mm nor more than 90 mm and the length Q of each of the coupling parts is not less than 1 mm nor more than 10 mm. Therefore, when a cable is formed, it is possible to greatly reduce a strain applied to the single-core coated optical fibers when the optical cable is bent, which enables the optical cable to have sufficient long-term reliability. Further, the collective connection is easy, which makes it possible to improve connection workability of the optical cable.

Next, a method of manufacturing the optical fiber ribbon of this embodiment will be described.

Figure 3:
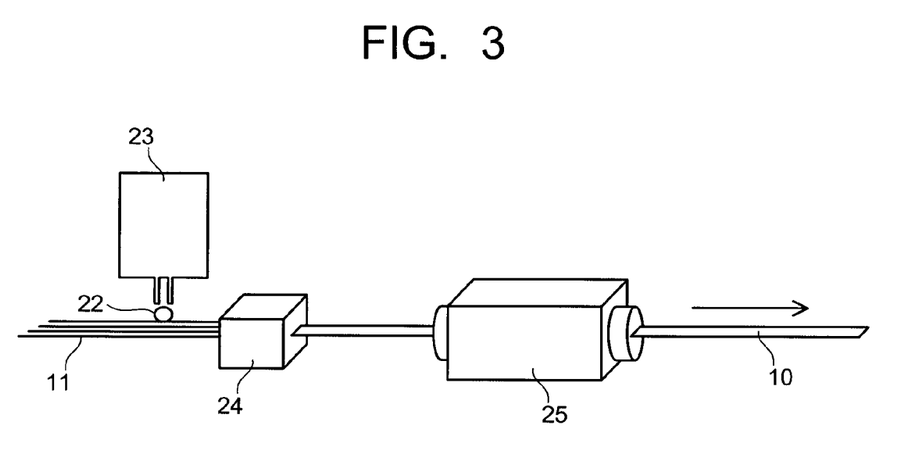
FIG. 3 is a view schematically showing an example of a device used for manufacturing the optical fiber ribbon of the embodiment.

FIG. 3 is a view schematically showing an example of a device used for manufacturing the optical fiber ribbon of the embodiment.

The manufacturing device includes: a small droplet injection device 23 injecting and applying, in a small droplet form, ultraviolet curable resin 22 being a coupling part forming material onto the four single-core coated optical fibers 11 which are fed out from a fiber feeding device (not shown) while being arranged in parallel and substantially in contact with one another; an assembly die 24 integrally forming the single-core coated optical fibers 11 onto which the ultraviolet curable resin 22 has been injected and applied in the small droplet form, so that the single-core coated optical fibers 11 have a tape-shaped cross section; an ultraviolet irradiation device 25 emitting ultraviolet radiation to the single-core coated optical fibers 11 having passed through the assembly die 24, thereby curing the ultraviolet curable resin 22 injected and applied by the small droplet injection device 23 to form the coupling parts; and a take-up device (not shown) taking up the optical fiber ribbon 10 obtained as a result of the formation of the coupling parts.

Figure 4:
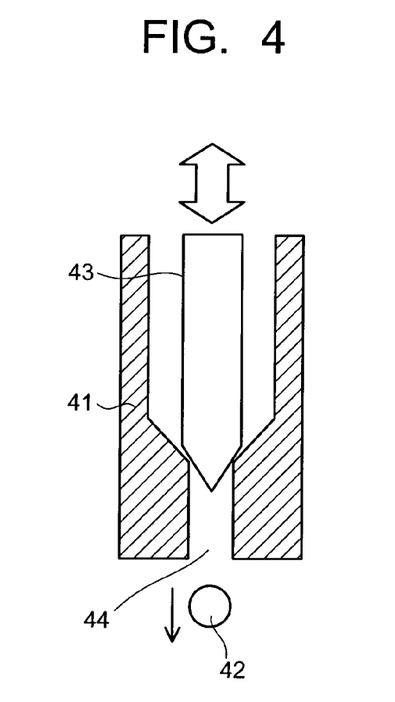
FIG. 4 is a cross-sectional view showing an example of a plunger-type injection device used as a small droplet injection device in FIG. 3.

The small droplet injection device 23 may be any, provided that it is capable of injecting and applying the ultraviolet curable resin 22 in the small droplet form onto predetermined positions of the four parallel single-core coated optical fibers 11, and an injection device having a plunger mechanism shown in FIG. 4 is usable, for instance. In the plunger-type injection device, as shown in FIG. 4, an injection plunger 43 causes the injection material (ultraviolet curable resin) in a cylinder 41 to be injected from an injection nozzle 44, and the injection plunger 43 is reciprocated at a high speed in the cylinder 41, whereby the ultraviolet curable resin 42 can be injected from the injection nozzle 44 as small droplets. An example of such a plunger-type injection device is CyberJet (trade name) manufactured by Musashi Engineering Inc. or the like. The small droplet injection device 23 is disposed immediately before the assembly die 24.

The assembly die 24 has a through hole having a tape-shaped cross section as previously described, and after passing therethrough, the four single-core coated optical fibers 11 are assembled in parallel on the same plane in a state where the adjacent single-core coated optical fibers are substantially in contact with each other, and a surface of the ultraviolet curable resin 22 in the small droplet form injected and applied by the small droplet injection device 23 is formed flatly.

In such a manufacturing device, immediately before the four single-core coated optical fibers 11 fed out from the feeding device 1 are inserted to the assembly die 24, the ultraviolet curable resin 22 is applied between the two adjacent single-core coated optical fibers 11 by the small droplet injection device 23, and thereafter the single-core coated optical fibers 11 are inserted to the assembly die 23. The four single-core coated optical fibers 11 sent out from the assembly die 23 are thereafter irradiated with ultraviolet radiation by the ultraviolet irradiation device 25, so that the ultraviolet curable resin 22 is cured, resulting in the formation of the optical fiber ribbon 10 of the embodiment in which the coupling parts each coupling only the two adjacent single-core coated optical fibers 11 are formed at intervals in the length direction and the width direction. The optical fiber ribbon 10 is thereafter taken up by the take-up device (not shown).

Figure 5:
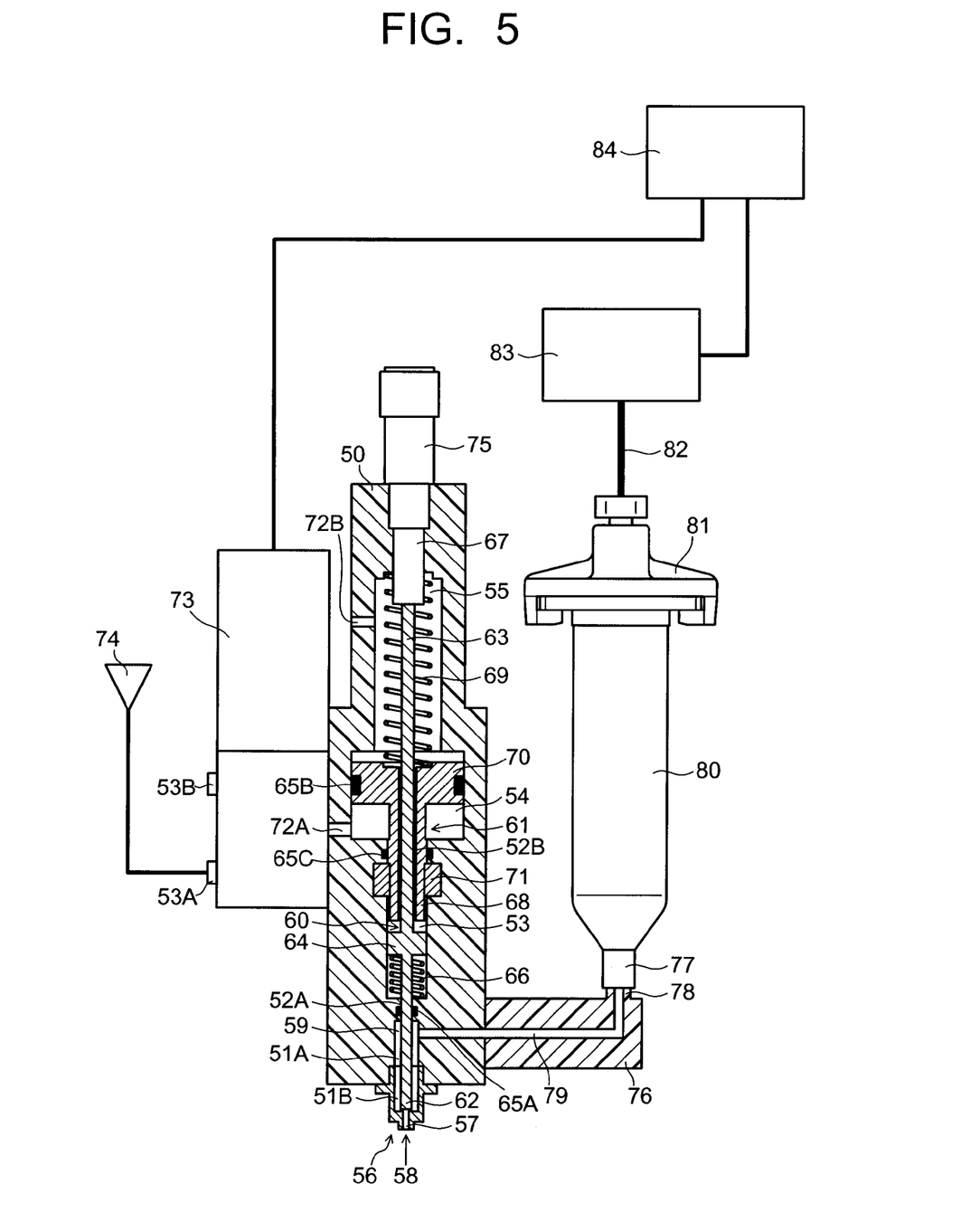
FIG. 5 is a view showing an example of the plunger-type injection device suitably used as the small droplet injection device in FIG. 3.

An example of the plunger-type injection device suitably used as the small droplet injection device 23 will be more concretely described.

The device basically includes: a liquid chamber having a jetting port jetting a liquid injection material (ultraviolet curable resin); a pushing member reciprocatable in forward and backward directions, without its front end portion and the vicinity of the front end portion being in contact with an inner wall of the liquid chamber; and a collision member reciprocating in the same direction as the reciprocating direction of the pushing member, and the device is disposed so that the pushing member moves forward when the collision member collides with the pushing member. Hereinafter, its concrete structure is shown in FIG. 5.

In FIG. 5, 50 denotes a main body of the device. The main body 50 has: a concave portion 51A being a cylindrical space formed at its front end; a through hole 52A with a small diameter formed at the rear of the concave portion 51A; a cylinder 53 being a space communicating with the through hole 52A; a piston chamber 54 formed at the rear of the cylinder 53 and being a space larger in diameter than the cylinder 53; and a spring chamber 55 formed at the rear of the piston chamber 54 and being a space smaller in diameter than the piston chamber 54.

A jetting nozzle 56 is installed on the main body 50 so as to lead to the concave portion 51A. In the jetting nozzle 56, a cylindrical concave portion 51B is formed at its rear end side, and a small-diameter jetting channel 57 communicating with the concave portion 51B is formed at its front end. In a front part of the jetting channel 57, a jetting port 58 is opened. The jetting nozzle 56 is installed on the main body 50, and the concave portion 51A and the concave portion 51B form a liquid chamber 59.

Inside the main body 50, a pushing member 60 and a collision member 61 are disposed so as to be reciprocatable in the forward and backward directions. The pushing member 60 is composed of a plunger 62 located in a front part, a rear abutting member 63 located in a rear part, and an abutting portion 64 connecting them.

The plunger 62 is a thin columnar member with a small diameter provided in the front part of the pushing member 60 and is disposed so that its front end is located in the liquid chamber 59 and its rear end is located in the cylinder 53. A seal 65A is provided on an inner wall of the through hole 52A so as to be in close contact with a side surface of the plunger 62. The seal 65A seals the plunger 62 while allowing the plunger 62 to slide, thereby isolating the liquid chamber 59 and the cylinder 53 from each other.

In the cylinder 53, a spring 66 in whose periphery the plunger 62 penetrates is provided. The spring 66 is disposed so as to be sandwiched between a front inner wall surface of the cylinder 53 and a front end of the abutting portion 64 and constantly biases the pushing member 60 backward. With such a structure, when the abutting portion 64 and the collision member 61 are not in contact with each other, the pushing member 60 is stopped in the biased state while abutting on a later-described rear stopper 67.

On the rear end of the plunger 62, the abutting portion 64 in a columnar shape or in a disk shape larger in diameter than the plunger 62 is fixed. The abutting portion 64 is disposed slidably in the cylinder 53. On a rear end of the abutting portion 64, the rear abutting member 63 in a columnar shape smaller in diameter than the abutting portion 64 is fixed. The rear abutting member 63 penetrates in a periphery of a spring 69 to extend up to the vicinity of a rear part of the spring chamber 55.

The spring 69 biases the collision member 61 forward. It is preferable that the spring 69 has such a strength and a length as to be capable of biasing the pushing member 60 to an advance stop position against the biasing force of the spring 66, in a state where a front space of the piston chamber 54 leads to the atmosphere.

The collision member 61 is composed of a colliding part 68 located in a front part and a piston 70 located in a rear part, and has a through hole 52B on center axes of these. The colliding part 68 is a columnar member smaller in diameter than the cylinder 53 and is provided coaxially with and in front of the piston 70, and its front end is located in the cylinder 53.

The cylinder 53 has therein a seal 65C and a guide 71. The seal 65C seals the colliding part 68 while allowing the colliding part 68 to slide in contact with the cylinder 53, thereby isolating the cylinder 53 and the front space of the piston chamber 54. The guide 71 slidably supports the colliding part 68 so that the colliding part 68 does not displace in a lateral direction.

The piston 70 is a cylindrical member, is disposed in the piston chamber 54, and divides the piston chamber 54 into the front space and a rear space. The piston 70 has a seal 65B on its side peripheral surface, so that the piston 70 is slidably sealed while in close contact with the piston chamber 54.

The through hole 52B penetrates from the front end of the colliding part 68 up to a rear end of the piston 70. The rear abutting member 63 of the pushing member 60 is axially inserted through the through hole 52B. The through hole 52B is formed to have an inside diameter larger than an outside diameter of the rear abutting member 63 so as not to obstruct the reciprocating movement of the pushing member 60.

On a side portion of the piston chamber 54, an air channel 72A is provided. The air channel 72A is formed from the side portion of the front space of the piston chamber 54 so as to lead to an electromagnetic changeover valve 73 provided outside the main body 50.

The electromagnetic changeover valve 73 has a port 53A leading to an air supply source 74 and a port 53B opening to the atmosphere, and is capable of changing between a first state where the front side of the piston chamber 54 and the air supply source 74 lead to each other and a second state where the front piston chamber 54 and the atmosphere lead to each other.

On a side portion of the spring chamber 55, an air channel 72B communicating with the outside is provided. Through the air channel 72B, the rear space of the piston chamber 54 and the spring chamber 55 constantly lead to the atmosphere.

The spring 69 is disposed between the rear end of the piston 70 and a rear inner wall surface of the spring chamber 55, and the piston 70 is biased forward by the spring 69.

At a rear end of the main body 50, the rear stopper 67 entering the spring chamber 55 is disposed. By abutting on a rear end portion of the rear abutting member 63, the rear stopper 67 restricts the backward movement of the pushing member 60. A rear end of the rear stopper 67 is connected to a micrometer 75, and by operating the micrometer 75, it is possible to adjust a front/rear position of the rear stopper 67.

On a front side portion of the main body 50, a syringe mounting member 76 is disposed. The syringe mounting member 76 has a syringe mounting portion 78 connectable to a syringe jetting port 77 storing a liquid material. In the syringe mounting member 76, a liquid material supply channel 79 is formed, with its one end being provided on a side surface near the vicinity of a rear end portion of the liquid chamber 59 and with its other end being provided on the syringe mounting portion 78. Through the liquid material supply channel 79, a syringe 80 mounted on the syringe mounting portion 78 leads to the liquid chamber 59.

An air tube 82 is connected to an upper portion of the syringe 80 via an adaptor 81, and the other end of the air tube 82 is connected to an air supply device 83. The air supply device 83 supplies air into the syringe 80 via the air tube 82 to set the inside of the syringe 80 to a desired pressure, whereby the liquid material in the syringe 80 is transferred to the liquid chamber 59.

The air supply device 83 and the electromagnetic changeover valve 73 are connected to a control part 84, and based on signals from the control part 84, the changeover of the electromagnetic changeover valve 73 and the air supply into the syringe are controlled.

Next, an optical cable using the optical fiber ribbons of this embodiment will be described.

Figure 6:
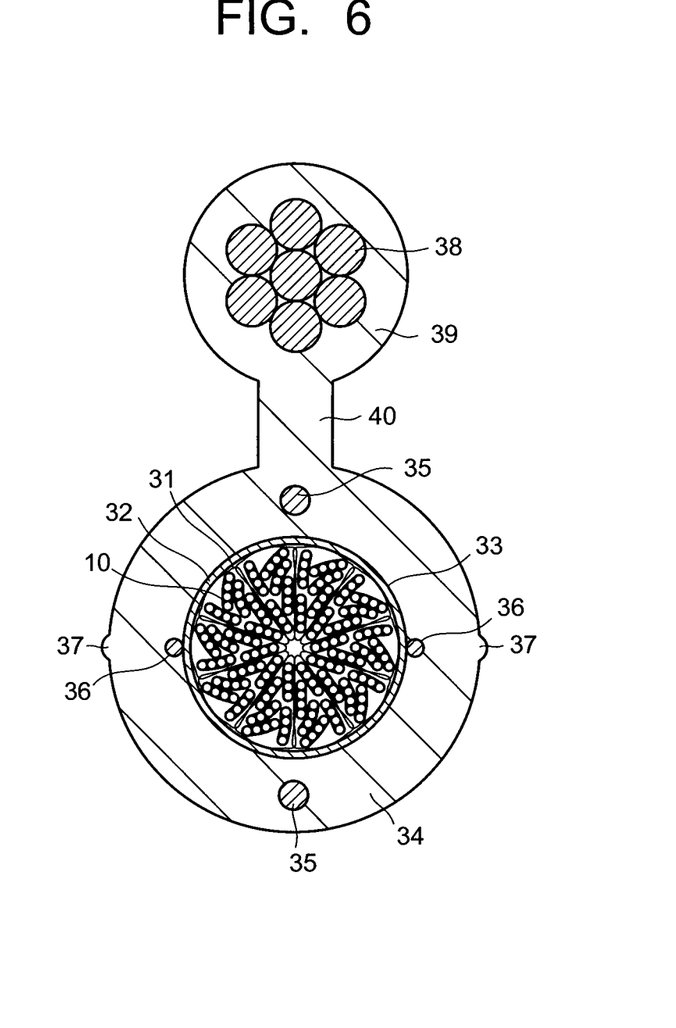
FIG. 6 is a cross-sectional view showing an example of an optical cable using the optical fiber ribbons of the embodiment.

FIG. 6 is a cross-sectional view showing an example of the optical cable using the optical fiber tapes of the present invention.

As shown in FIG. 6, in this optical cable, plural, for example, five pieces of the optical fiber ribbons 10 are assembled, and around an outer periphery of the assembly, a colored string for rough winding or a colored tape 31 for rough winding serving as discrimination is wound in one direction, whereby an optical fiber unit 32 is formed. Further, plural, for example, ten pieces of the optical fiber units 32 are assembled, and a jacket 34 covers an outer periphery of the assembly via a press winding layer 33 made of longitudinally attached protection tapes having a water cutoff function. As the colored tape 31 for rough winding included in the optical fiber unit 32, a high-density polyethylene stretched tape or the like is used, for instance. Further, as a material of the protection tape forming the press winding layer 33, a polyester tape, a PET (polyethylene telephthalate) tape, a polyester non-woven fabric, or the like is used. Further, as the jacket 34, synthetic resin such as polyethylene or polyvinyl chloride is used.

In the jacket 34, tension members 35, 35 each made of two copper wires, FRP (fiber reinforced plastics), or the like are longitudinally buried at positions symmetric with respect to a center of the cable. Further, at positions rotated by 90° in a circumferential direction from these tension members 35, totally two tear cords 36, 36 made of polyester or the like are longitudinally buried, one at each of the positions. That is, these two tear cords 36, 36 are also buried at positions symmetric with respect to the center of the cable similarly to the two tension members 35, 35. Further, on an outer periphery of the jacket 34 in which the tear cords 36, 36 are buried, convex portions 37, 37 are provided, which makes it possible to know the positions where the tear cords 36, 36 are buried, from the outside.

Further, in this optical cable, a cable support wire 38 made up of copper wires or the like is attached to the jacket 34 along a length direction of the cable. On an outer periphery of the cable support wire 38, a coating 39 made of synthetic resin such as polyethylene or polyvinyl chloride is provided, and this coating 39 is integrally coupled with the jacket 34 via a neck portion 40. The optical cable can have a structure not having such a cable support wire 38.

In this optical cable, since the optical fiber ribbons 10 having the characteristics previously described are used, it is possible to highly densely house the optical fiber ribbons 10 in the optical cable, which can achieve a reduction in size of the optical cable. That is, since a strain applied to the single-core coated optical fibers when the optical cable is bent can be greatly reduced, the optical fiber ribbons 10 can be highly densely housed in the optical cable.

EXAMPLE

Next, examples of the present invention and comparative examples will be concretely described, but the present invention is not limited at all to the following examples.

Example 1

An optical fiber ribbon shown in FIG. 1 was fabricated in which a length Q of coupling parts each coupling only two adjacent single-core coated optical fibers and their arrangement interval P were 3 mm and 65 mm respectively. As the single-core coated optical fiber, used was a single-core coated optical fiber with a 250 μm outside diameter (D) in which a silica glass SM optical fiber with a 125 μm outside diameter was coated with a primary coating made of urethane acrylate-based ultraviolet curable resin whose Young's modulus at 23° C. was 5 MPa and a secondary coating made of urethane acrylate-based ultraviolet curable resin whose Young's modulus at 23° C. was about 700 MPa. Further, for forming the coupling parts, used was acrylic ultraviolet curable resin whose viscosity at 25° C. measured by a cone plate viscometer based on JIS K 6833 was 14000 mPa·s.

Next, these optical fiber ribbons were used to manufacture a 200-core optical cable shown in FIG. 6. The five optical fiber ribbons were assembled, and as the colored tape for rough winding, a high-density polyethylene stretched tape with a 2.0 mm width was wound in one direction on an outer periphery of the assembly, whereby an optical fiber unit was fabricated. Ten pieces of the optical fiber units were twisted together in one direction, and a protection tape made of a polyester nonwoven fabric with a 0.2 mm thickness was wound therearound. Thereafter, the resultant was sent out together with a cable support wire to a pushing machine while two tension members and two tear cords were attached along a periphery of the protection tape, and low-density polyethylene was pushed out and applied on an outer periphery of these, whereby the optical cable was manufactured. As the tension member, a hard-drawn galvanized steel wire with a 0.7 mm diameter was used, and as the tear cord, a 1000 denier three-thread polyester strand was used. As the cable support wire, a steel strand having seven element wires (element wire diameter 1.40 mm) was used. Sizes of the optical cable are as follows.

outside diameter of the jacket measured at a portion except the convex portions: 9.5 mm
inside diameter of the jacket: 5.5 mm
thickness of the jacket measured at a portion except the convex portions: 2.0 mm

Example 2, Comparative Examples 1 to 7

Optical fiber ribbons were fabricated in the same manner as in the example 1 except that at least one of a length Q of coupling parts each coupling only two adjacent single-core coated optical fibers and their arrangement interval P was varied as shown in Table 1. Further, optical cables were fabricated by using the obtained optical fiber ribbons as in the example 1.

Regarding the above-described optical cables 1 obtained in the examples and the comparative examples, a strain characteristic when the optical cable was bent was examined and connection workability of the optical fiber ribbons was evaluated.

As for the strain characteristic when the optical cable was bent, the optical cable was bent, with a 120 mm radius, a 300 mm radius, and a 500 mm radius, and strains occurring in the single-core coated optical fibers at this time were measured, and their maximum value was found. The strains were measured by a high-resolution strain measuring instrument of a BOTDA measurement type (manufactured by Nuebrex Co., Ltd. model number NBX-6020A; measurement wavelength 1550±2 nm, distance resolution 20 mm).

As for connection workability of the optical fiber ribbons, a commercially available fusing holder (50 mm length) was used to actually perform a fusion splicing work and the time required for the work (average fusion time) was measured.

Figure 7:
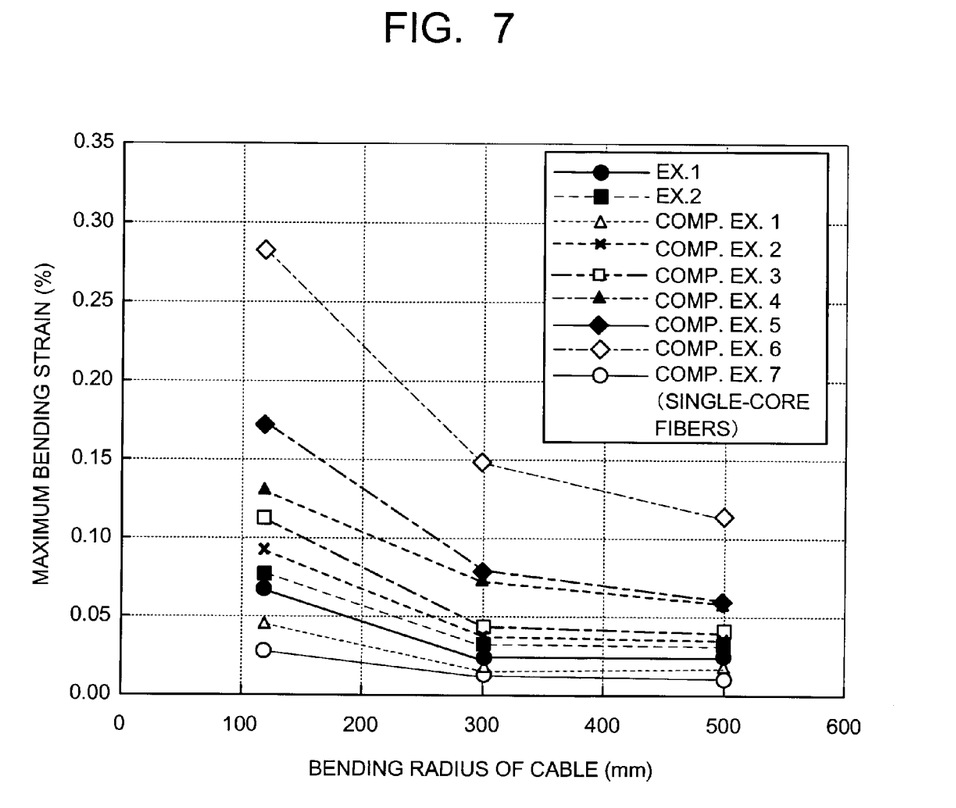
FIG. 7 is a graph showing strain characteristics at the bending time of optical cables, which are measured in examples and comparative examples.

The measurement results of the strain characteristics when the optical cables are bent are shown in FIG. 7. The measurement results of the connection workability of the optical fiber ribbons are shown in Table 1, as relative values when an average fusion work time of a conventional-type optical fiber ribbon, that is, an optical fiber ribbon in which coating is applied collectively on an outer periphery of four single-core coated optical fibers is set to 1.00.

FIG. 7 further shows the results of the measurement regarding an optical cable which is manufactured in the same manner as in Example 1 except that as an optical fiber ribbon, used is a conventional-type optical fiber ribbon, that is, an optical fiber ribbon in which coating is collectively applied on an outer periphery of four single-core coated optical fibers (Comparative Example 6), and regarding an optical cable which is manufactured in the same manner as in the example 1 except that the single-core coated optical fibers are not formed into a tape but are housed in a cable as they are (Comparative Example 7).

TABLE 1

| | Length Q of Coupling Part (mm) | Arrangement Interval P of Coupling Parts (mm) | Average Fusion Splicing Time (Relative Value*) |
|---|---|---|---|
| Example 1 | 3 | 65 | 1.01 |
| Example 2 | 3 | 45 | 1.02 |
| Comparative Example 1 | 3 | 125 | 1.15 |
| Comparative Example 2 | 3 | 15 | 1.01 |
| Comparative Example 3 | 15 | 90 | 1.02 |
| Comparative Example 4 | 20 | 100 | 1.01 |
| Comparative Example 5 | 80 | 200 | 1.09 |
| Comparative Example 6 | — | — | 1.00 |
| Comparative Example 7 | — | — | 4.00 |

*Relative value when the average fusion splicing time of the conventional-type optical fiber ribbons is set as 1.00

As is apparent from these results, the optical fiber ribbons of the examples all have good strain characteristics at the time of the bending of the optical cable and good connection workability. On the other hand, in the comparative examples, those having a good strain characteristic at the bending time of the optical cable were poor in connection workability and those having good connection workability were poor in the strain characteristic.

What is claimed is:
1. An optical fiber ribbon, comprising:
four single-core coated optical fibers arranged in parallel on a same plane; and
coupling parts arranged at intervals in a length direction and a width direction, each of the coupling parts coupling only adjacent two of the single-core coated optical fibers, wherein
the coupling parts coupling each of the two outer optical fibers of the four optical fibers and each of the two inner optical fibers adjacent to each of them respectively are the same in length and each disposed so as to be substantially at a length-direction,
the coupling parts coupling the two inner optical fibers of the four optical fibers are the same in length and each disposed so as to be substantially at a length-direction middle between the outer coupling parts, and
an interval P of the coupling parts coupling the same two single-core coated optical fibers is not less than 45 mm nor more than 65 mm, and a length Q of each of the coupling parts is not less than 2 mm nor more than 4 mm.

2. The optical fiber ribbon according to claim 1,
wherein the coupling parts are each made of ultraviolet curable resin whose viscosity at 25° C. measured by a cone plate viscometer based on JIS K 6833 is not less than 11000 mPa·s nor more than 17000 mPa·s.

3. The optical fiber ribbon according to claim 1,
wherein the coupling parts are each made of resin applied from one side between the two adjacent single-core coated optical fibers.

4. The optical fiber ribbon according to claim 1,
wherein a maximum bending strain at the time of bending with a 300 mm radius is 0.05% or less.

5. An optical cable comprising the optical fiber ribbon according to claim 1.

* * * * *